US011948136B1

(12) United States Patent
Thimmareddy et al.

(10) Patent No.: US 11,948,136 B1
(45) Date of Patent: Apr. 2, 2024

(54) BANKING AT A MULTI-LEVEL ATM

(71) Applicant: Bank of America Corporation, Charlotte, NC (US)

(72) Inventors: Arjun Thimmareddy, Charlotte, NC (US); Bryan T. King, Charlotte, NC (US); Alexander S. Lee, Jacksonville, FL (US); Vaishnavi Varma, New York, NY (US); Tony Aidoo, Aubrey, TX (US); Paula M. Booze, Charlotte, NC (US); Ramesh B. Chandanala, Charlotte, NC (US); William R. Conrad, New Castle, DE (US); Juliet Abdul-Aziz, Chester (GB); Gerard P. Gay, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/965,111

(22) Filed: Oct. 13, 2022

(51) Int. Cl.
*G06Q 20/10* (2012.01)
*G06Q 20/32* (2012.01)
*G06Q 20/40* (2012.01)

(52) U.S. Cl.
CPC ..... *G06Q 20/1085* (2013.01); *G06Q 20/3278* (2013.01); *G06Q 20/4014* (2013.01)

(58) Field of Classification Search
None
See application file for complete search history.

(56) References Cited

U.S. PATENT DOCUMENTS

| 11,023,871 | B1* | 6/2021 | Phillips | G06Q 20/40145 |
| 2013/0154460 | A1* | 6/2013 | Paterson | G07F 19/20 312/294 |
| 2013/0238497 | A1* | 9/2013 | Ramachandran | G06Q 20/385 705/41 |
| 2018/0165663 | A1* | 6/2018 | Naik | G06Q 20/3223 |
| 2022/0058601 | A1* | 2/2022 | Yaqub | G06Q 20/3829 |

* cited by examiner

*Primary Examiner* — Joseph W. King
(74) *Attorney, Agent, or Firm* — Weiss & Arons LLP

(57) ABSTRACT

An ATM is configured to interact with a mobile device and provide user access to one or more of the banking services available at the ATM using the mobile device. Banking-related information may be viewed and/or input at the ATM using the mobile device. The ATM may have multiple vertical levels of deposit slots, withdrawal trays and/or receipt dispensers. A level at the ATM at which the user interacts with the ATM for deposits, withdrawals, or receipts may be selected. The level may be specified by the user of the mobile device, at the ATM or using the mobile device, or may be determined by the ATM.

7 Claims, 13 Drawing Sheets

BANKING AT A MULTI-LEVEL ATM

FIELD OF THE DISCLOSURE

Aspects of the disclosure relate to a multi-level automated teller machine (ATM) or a multi-level point-of-sale device (POS) and the use of a mobile device to engage in banking functions on the multi-level ATM or POS.

BACKGROUND OF THE DISCLOSURE

A user usually initiates a transaction at an ATM or POS using an electronic card, such as a bank card, debit card, or credit card. (Unless otherwise noted, the term ATM is used herein to also refer to a POS). The user is then prompted for a personal identification number (PIN) at the ATM. Upon the detection of a correct PIN number entry at the ATM, the ATM or POS may provide the user with access to banking services that may be performed at the ATM.

Prior art ATMs have a screen. A menu of available banking services may be displayed on the screen at the ATM and the user may select a desired option from the menu. Available banking services at an ATM may include withdrawals, transfers, balance inquiries, and may include deposits, to name a few. Available banking functions at a POS may include point of service electronic funds transfers. Some ATMs may have a touchscreen that allows a user to select a function from the menu of options and enter other information such as amounts to withdraw or an amount of a deposit directly on the screen. Some ATMs have a screen without touchscreen functionality. When the screen is not a touchscreen, a menu may be shown on the screen of the ATM and selections from the menu may be performed using one or more buttons provided on the sides of screen. A numeric or alphanumeric keypad may be provided for data entry such as to entry a personal identification number (PIN) to gain user access to the ATM or to enter an amount of money to withdraw, deposit, transfer or pay. Data may be input to the ATM by a user using one or more input devices, such as with a keypad, buttons adjacent the screen, or directly on a touchscreen.

In using an ATM in a conventional manner, some users may be wary that other people near the ATM may be able to see the screen on the ATM while they are engaged in transactions. Some users may forget to bring the card needed to use the ATM. convenient.

It is an object of this invention to make interactions with an ATM more secure and

SUMMARY OF THE DISCLOSURE

Methods, an apparatus, and a mobile app may be provided to enable a banking transaction to be conducted at an ATM using a mobile device. The ATM may be multi-level, i.e., the ATM has multiple vertical levels (i.e, two or more levels), wherein each of at least two of the multiple vertical levels may include at least one of an input tray or an output tray. The input tray of each of the at least two of the multiple vertical levels may include a deposit slot to accept a deposit, such as a deposit of cash or checks. The output tray of each of at the at least two of the multiple vertical levels may be a withdrawal tray. In embodiments, each of the at least two of the multiple vertical levels may include a second output tray to dispense a receipt for a banking transaction. In embodiments, both input and output trays may be included in each of the multiple vertical levels.

The ATM may therefore have multiple vertical levels at which the same types of banking transactions may be performed. The multiple vertical levels of trays may allow users to use the input and output trays at different levels. For example, people of different heights, or positioned at different heights (such as a user sitting in a car or a user in a wheelchair) may be enabled to more easily access a particular level of input and output trays. The level of the ATM at which the transaction may be performed may be selected in various ways. For example, the level may be user-selected (e.g., a user may press a button located adjacent to the desired level of trays or a user may select the level using the mobile device). As another example, the level may be automatically selected, such as by the ATM. The ATM may have one or more detectors and be configured to select the level using the one or more detectors.

The ATM may be screen-less such that the ATM has no screen for use in accessing banking services or performing a banking transaction. Instead, banking services at the ATM may be accessed and banking transaction performed using a mobile device. The screen on the mobile device may be used for viewing or inputting banking-related information. Omitting a screen on the ATM may enable the inclusion of multiple vertical levels of input and/or output trays at an ATM.

In embodiments, the ATM and the mobile device may be configured to communicate via short range wireless communication, such as one or more of near-field communication (NFC), Zigbee, Wi-Fi, Bluetooth, or Ultra-Wideband technologies. In embodiments, the ATM and the mobile device may be configured to communicate using a mobile communications network.

The method may include automatically detecting, by the ATM a presence of the mobile device of a user in a vicinity of the ATM. The presence of the mobile device of the user may be detected using short range wireless communication. After automatically detecting the presence of the mobile device using short range wireless communication, the presence of the mobile device may be verified. In embodiments, the presence may be verified using a Global Positioning System (GPS) location obtained from the mobile device. The detection or verification of the mobile device may trigger a pushing, to the mobile device, of a mobile application to access banking services on the ATM using the mobile device.

In embodiments, a mobile device may request to initiate a banking transaction with the ATM without an automatic detection of a mobile device by the ATM. For example, a user may initiate the banking transaction with the ATM using the mobile device before the mobile device may be automatically detected.

The method may include transmitting, by the ATM, a signal to the mobile device to prompt the user to select an option on the mobile device to access banking services offered at the ATM using the mobile device. In some embodiments, the signal that is transmitted may include a message that includes a link for the mobile device to access a mobile application. The mobile application may provide an interface for the entry of user identification information and for access to the services offered at the ATM. In some embodiments, the transmission of the signal from the ATM to the mobile device may trigger the launch (opening) of a mobile application on the mobile device.

In some embodiments, the mobile application may include a menu that replicates the menu that would have been accessed on an ATM had a screen been available on the ATM. For example, in some embodiments, the mobile application may be different from the menu that would have been accessed on the ATM.

The method may further include verifying that the user has permission to access the banking services offered at the ATM based on user identification information entered at and submitted via the mobile device. In embodiments, the verification may include multi-factor authentication using two or more credentials. After verification of the user identification information, the user may be enabled to access one or more of the banking services at the ATM using the mobile device and to view account-related information on the mobile device.

In embodiments, when the user is banking using the mobile device, the method may enable the user to elect to make a deposit or a withdrawal at the ATM via a user selection on the mobile device. When there are multiple vertical levels of input and output trays on the ATM, the method may enable the selection, by the user, of one of the multiple vertical levels to be used for the deposit or withdrawal. In embodiments, the selection of the level to be used for the deposit or withdrawal may be entered on the ATM or, in embodiments, the selection may be entered using the mobile device. In embodiments, the ATM may accept the deposit or dispense the withdrawal elected by the user using the mobile device at the selected level of input and output trays. In embodiments, the ATM may be configured to select the one of the multiple vertical levels at which to accept the deposit or dispense the withdrawal.

One or more images or video may be obtained with a camera on the mobile device to monitor security near the mobile device.

A method may also be provided for using a mobile device to conduct a banking transaction via an ATM that has multiple vertical levels, wherein each of multiple vertical levels may include at least one of an input tray or an output tray. The input tray at each of the multiple vertical levels may include a deposit slot, such as for a deposit of cash or checks. The output tray at each of the multiple vertical levels may include a withdrawal tray to dispense a withdrawal. In embodiments, each of the multiple vertical levels may include a second output tray to dispense a receipt for a banking transaction. In embodiments, both input and output trays may be included in each of the multiple vertical levels.

The ATM may therefore have multiple vertical levels at which the same types of transactions may be performed. The ATM may also be screen-less.

The method may provide a mobile device having a short-range wireless communication capability such that the mobile device is automatically detectable by an ATM in a vicinity of the ATM. The mobile device may engage in a short range wireless communication with the ATM upon detection of the mobile device by the ATM. The mobile device may be configured to permit entry, at the mobile device, of user identification information to access banking services provided at the ATM. After verification, the mobile device may verify, via the ATM, that the user has permission to access the banking services offered at the ATM based on the user identification information.

The method may include accessing of the one or more banking services at the ATM using a mobile application on the mobile device.

The method may include submitting, using the mobile device, a request for a deposit to be performed at the ATM, thereby causing the ATM to accept the deposit at the ATM. The method may include submitting, using the mobile device, a request for the ATM to dispense a withdrawal at the ATM, thereby causing the ATM to dispense the withdrawal at the ATM. When there are multiple vertical levels of input and output trays on the ATM, the method enables the selection by the user of one of the multiple vertical levels to be used for the deposit or withdrawal. In embodiments, the method further enables the selection by the user of the level to be used for the deposit using the mobile device or, in embodiments, the method enables the selection by the user on the ATM. In embodiments, the ATM may accept the deposit or dispense the withdrawal elected by the user using the mobile device at the selected level of input and output trays.

A method may also be provided for enabling a banking transaction to be conducted at an ATM that has multiple vertical levels. Each of at least two of the multiple vertical levels may include at least one of an input tray or an output tray. The input tray of each of the at least two of the multiple vertical levels may include a deposit slot to accept a deposit, such as a deposit of cash or checks. The output tray of each of at the at least two of the multiple vertical levels may be a withdrawal tray to dispense a withdrawal. In embodiments, each of the at least two of the multiple vertical levels may include a second output tray to dispense a receipt for a banking transaction. In embodiments, both input and output trays may be included in each of the multiple vertical levels.

The ATM may therefore have multiple vertical levels at which the same types of transactions may be performed but at different heights. In embodiments, the ATM may be screen-less.

The method may provide access, by the ATM to a mobile device in a vicinity of an ATM, to enable a user to select an option to access banking services offered at the ATM using a mobile device. The method may verify that the user has permission to access the banking services offered at the ATM based on user identification information submitted via the mobile device. After verification of the user identification information, the method may enable the user to access the banking services at the ATM using the mobile device and to view information related to the banking services on the mobile device. The method may include accepting a deposit at one of the deposit slots or dispensing a withdrawal at one of the withdrawal trays.

The method may enable the selection, by the user, of one of the multiple vertical levels to be used for a deposit or a withdrawal. In embodiments, the selection of the level to be used for the deposit or withdrawal may be entered on the ATM or, in embodiments, the selection may be entered using the mobile device. In embodiments, the ATM may accept the deposit or dispense the withdrawal elected by the user using the mobile device at the selected level of input and output trays.

An ATM that has multiple vertical levels of deposit slots and withdrawal trays may be provided. The ATM may allow the same types of transaction to be performed at a selected one of the multiple levels. The ATM may also be screen-less such that the ATM has no screen for accessing banking services or performing a banking transaction.

The ATM may include a non-transitory computer-readable memory storing computer-executable instructions that, when executed by a processor on a computer, cause the computer to provide access, by an ATM to a mobile device in a vicinity of an ATM, to enable a user to select an option to access banking services offered at the ATM using a mobile device, verify that the user has permission to access the banking services offered at the ATM based on user identification information submitted via the mobile device, and, after verification of the user identification information, enable the user to access the banking services at the ATM using the mobile device and to view information related to the banking services on the mobile device.

The banking services that the user may be enabled to access at the ATM using the mobile device may include at least one of a cash withdrawal, a deposit of cash or a check, an electronic transfer, a check balance transaction, or an electronic payment. The computer-executable instructions, when executed by a processor on a computer, may further cause the computer to perform at least one of accepting a deposit or dispensing a withdrawal at the ATM. The computer-executable instructions may enable the selection of one of the multiple vertical levels to be used for making deposits or withdrawals on the ATM. In embodiments, the level selection may be entered using the mobile device.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

The present disclosure relates to methods of interacting with an ATM that has multiple vertical levels of input trays, output trays, or input and output trays using a mobile device for data input and display. The ATM may be used to obtain or submit items or objects. For example, the ATM may be used to obtain a cash withdrawal, to obtain a printed receipt, or to deposit checks or cash.

Illustrative embodiments of methods and apparatus in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of methods and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

Methods and apparatus described herein are illustrative. Methods and apparatus of the invention may involve some or all of the steps of the illustrative methods and/or some or all of the features of the illustrative apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

Figure 1:
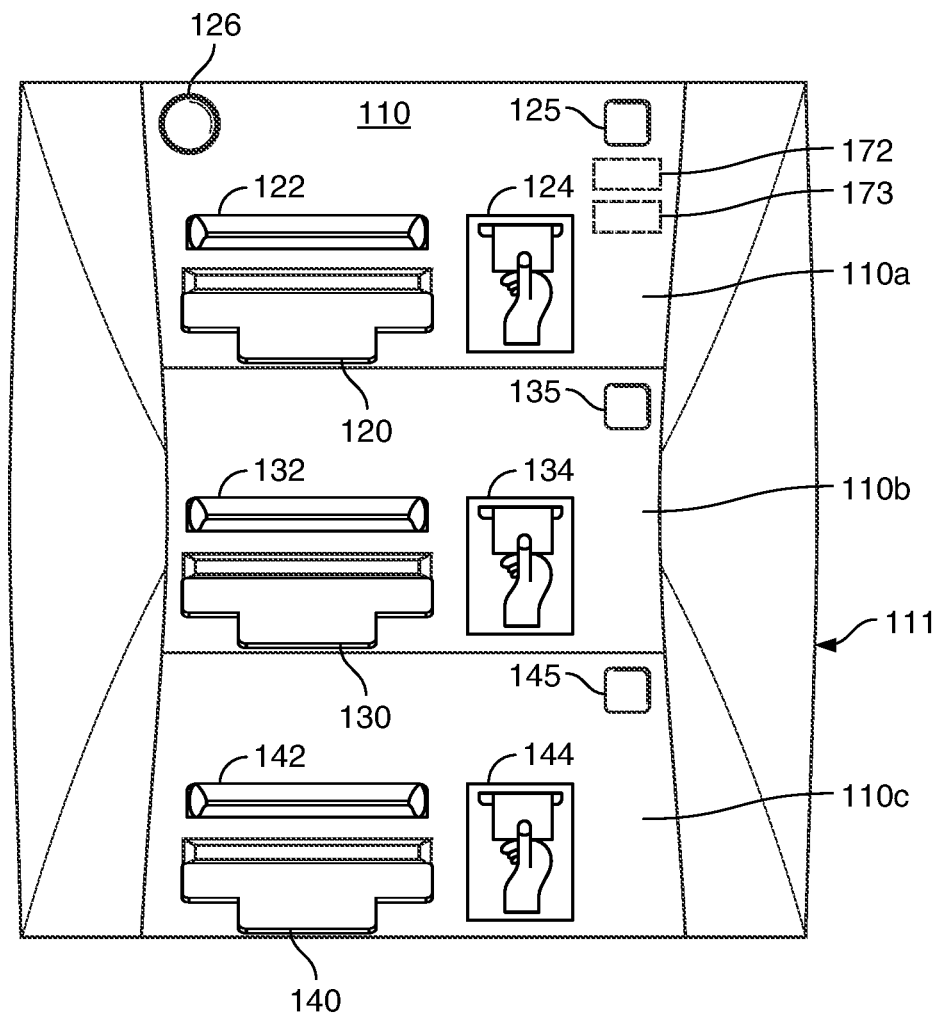
FIG. 1 shows an illustrative ATM that has multiple vertical levels of input and output trays at the ATM in accordance with principles of the disclosure.

FIG. 1 shows an illustrative ATM 110 in accordance with principles of the disclosure. ATM 110 may be provided by a bank or a non-bank operator (e.g., an ATM installed at a store). ATM 110 may be configured by hardware, software, or a combination thereof, to provide a variety of services. Some ATMs may provide a fuller set of services including cash withdrawals, cash or check deposits, electronic transfers, check balances, electronic payments, or other banking functions. Some ATMs may provide a subset of these services or other services.

ATM 110 may be standalone, located in a kiosk 111, may be mounted in a wall, or otherwise made available to users. Components or circuitry coupled to ATM 110, such as any components or circuitry mounted in or near ATM kiosk 111 or otherwise connected or linked to ATM 110, may also be considered part of ATM 110 for purposes of this disclosure.

ATM 110 may have multiple vertical levels (e.g., two or more levels) of input and/or output trays. In the example illustrated in FIG. 1, ATM 110 has three levels 110a (a top level), 110b (a middle level), and 110c (a bottom level) of input and output trays which have respective openings in the ATM for a user to insert items or withdraw items from. An input tray may be, for example, a deposit slot to deposit cash or checks, and an output tray may be, for example, a withdrawal tray to dispense cash or a receipt dispenser to dispense a banking transaction receipt. Thus, in the illustrated example, top level 110a may have a first withdrawal tray 120, a first deposit slot 122, and a first receipt dispenser 124. Middle level 110b may have a second withdrawal tray 130, a second deposit slot 132, and a second receipt dispenser 134. Bottom level 110c may have a third withdrawal tray 140, a third deposit slot 142, and a third receipt dispenser 144.

There may be one or more ways for a user to select which one of the top, middle or bottom levels to use. In embodiments, each level may have a respective selector such as, for example, buttons 125, 135, 145 to be individually activated by a user to select which one of the top, middle or bottom levels to use. In embodiments, rather than three selectors, there may be one selector (e.g. a keypad or a switch, to name a few) to select the desired level on ATM 110. In embodiments, there may be a selector in a mobile application that interacts with the ATM 110. In embodiments, ATM 110 may have one or more detectors for automatically selecting a level for the user. In the latter case, in one example, camera 126 may include a detector that is used to automatically select the level on ATM 110 at which the user will make a deposit, withdraw cash or receive a receipt. The automatic detection may be based, for example, on a detection, such as with image processing or level sensing, of the top of the user's head.

ATM 110 may be screen-less. As described below, a screen on a mobile device is used instead to interact with ATM 110, such as for viewing and for input. ATM 110 may also include a security camera 126 to monitor an area surrounding ATM 110.

ATM 110 may include a transceiver 172 and/or router 173 configured for communicating with mobile devices. In embodiments, transceiver 172 and/or router 173 may communicate via one or more short range wireless communications technologies. For example, transceiver 172/router 173 may be compatible with one or more of near-field communication (NFC), Wi-Fi, Zigbee, Bluetooth, or Ultra-Wideband (UWB) technologies. Transceiver 172/router 173 may include a detector for detecting a presence of a mobile device in the vicinity of ATM. ATM 110 may be configured for communication with a mobile communications network.

Figure 2A:
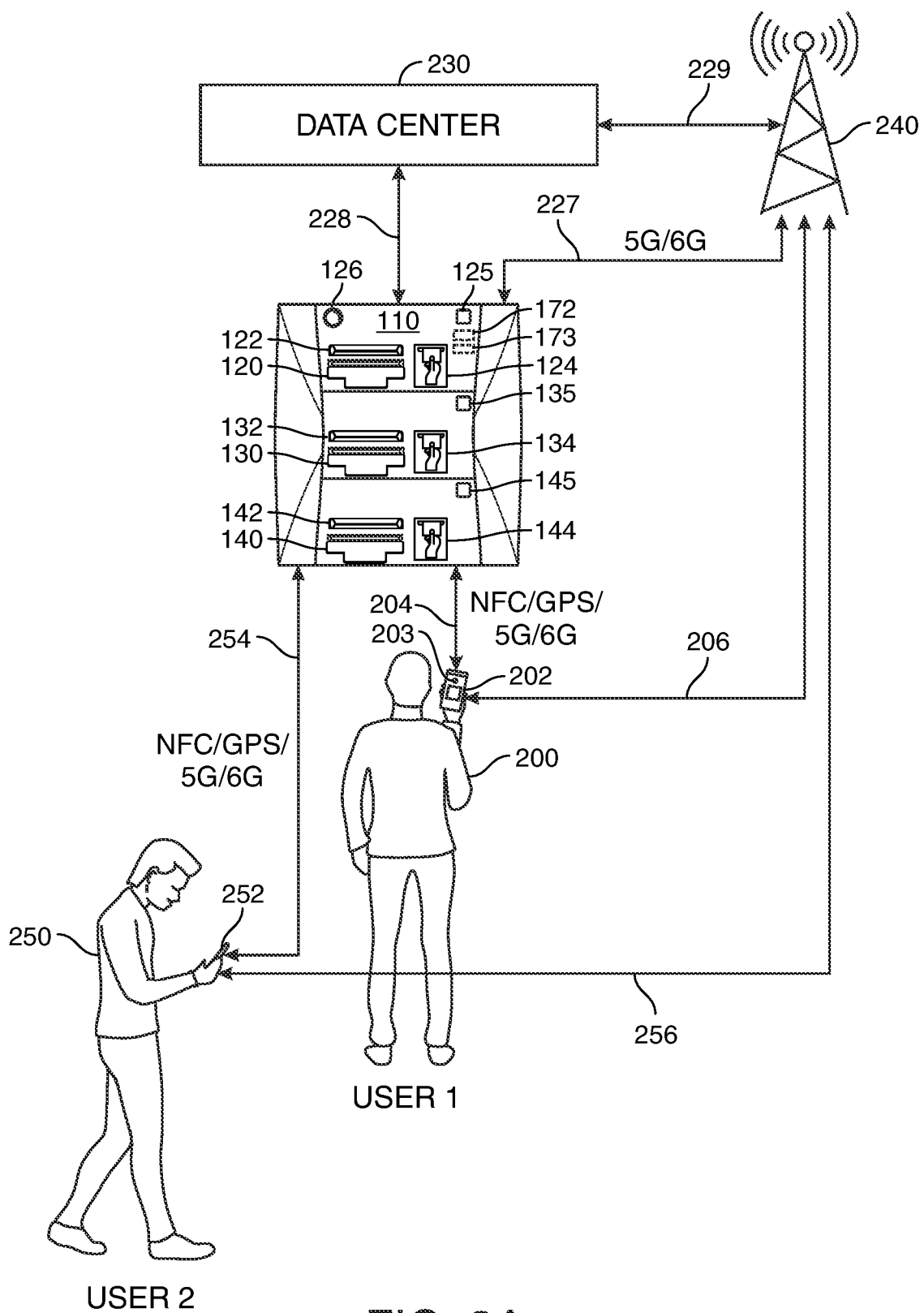
FIG. 2A shows an illustrative manner of using one or more mobile devices to interact with an ATM at a top level of multiple vertical levels of input and output trays in accordance with principles of the disclosure.

FIG. 2A shows an illustrative environment in which users may interact with an ATM 110 using a mobile device. Only one ATM is shown in FIG. 2. However, there may be multiple ATMs at a particular location. While ATM 110 may be screen-less, there may be one or more other ATMs at that same location near ATM 110 that have their own screens for those who want to bank conventionally using an ATM that has a screen.

ATM 110 may be configured to communicate with a data center 230. Data center 230 may include one or more central servers. Communications between ATM 110 and data center 230 may be configured to be conducted via link 228, which may represent one or more wired connections. Communications between ATM 110 and data center 230 may be performed via a wireless communication network 240, such as via a 5G network, using a wireless link or links 227 and 229. Communications may also be conducted via a combination of wired and wireless communications.

Data center 230 may be maintained as a private network or may be cloud-based. Data center 230 may provide access to and store data, including financial data. The data may allow ATM 110 to verify a user's identity, to provide financial information needed by the ATM such as customer account information and balances available, and to collect information relating to new transactions performed at ATM 110.

Mobile device 202 may be one of a smartphone, a laptop, tablet, iPad, a smart car, a smart card, or any other computing device that is able to communicate with ATM 110 using one or more wireless communication technologies. The wireless communication technology that is used for mobile—ATM communications may include a short range wireless communication technology. Mobile device 202 may have a display and may have one or more ports to connect external devices. The display on mobile device 202 may be a touchscreen, in which case user input may be via the screen. Mobile device 202 may have or be connected to a keypad (not shown) for user input. Mobile device 202 may also have or be connected to one or more cameras, such as camera 203, on the front or back of mobile device 202. Mobile device 202 may communicate with ATM 110, for example, over link 204 such as with a short range wireless communication or via a link 206 over a mobile communications network 240, such as a 5G or 6G network.

Mobile device 202 may have a memory that is configured to have one or more applications ("mobile applications" or "apps") saved thereon. One of the applications that may installed on the mobile device 202 may be an application to access services available at ATM 110.

As shown in FIG. 1, a first user 200, user 1, in the vicinity of ATM 110 may access ATM 110 with mobile device 202.

User 200 may initiate contact with ATM 110 using mobile device 202 even before user 200 is in proximity to the ATM 110 such that mobile device 202 may be detected by ATM 110. User 200 may already have the relevant application loaded on mobile device 202 or may have to download the application to the mobile device 202 to initiate contact.

In embodiments, user 200 need not initiate contact as ATM 110 may be configured to automatically detect the presence of mobile device 202 when mobile device 202 comes into proximity to ATM 110. The specific distance of mobile device 202 to ATM 110 that may trigger the detection of mobile device 202 may vary. For example, the distance may be based on a particular short-range wireless communication technology that may be used. For example, mobile device 202 detection may be detected within a range of 3 or fewer feet from ATM 110 using one type of technology or may have a longer range with a different technology.

ATM 110 may perform a check to confirm the presence of mobile device 202 at the expected location near ATM 110. The additional check may be performed by transmitting a signal to mobile device 202 to allow ATM 110 to verify the expected location using a Global Positioning System (GPS) information from mobile device 202, and to compare the verified location of mobile device 202 to the location of ATM 110. Any detected anomaly between the GPS location information and the expected location may be noted and may cause the transaction to be terminated or re-confirmed. This may help to prevent fraud or to account for a system malfunction. Confirmation of user information may be performed in conjunction with data center 230.

ATM 110 may transmit a signal to mobile device 202 to prompt user 200 to access services offered at the ATM using mobile device 202. The signal may be transmitted in one or more formats, such as via a notification sent to mobile device 202. In embodiments, the notification may be sent, for example, using a short range wireless technology, such as NFC, to alert user 200 of a banking option using mobile device 202. The notification may also push a link to the mobile application to mobile device 202. User 200 may use the link to download and install the mobile application if the user does not already have the application installed on mobile device 202.

If user 200 chooses to access services offered at ATM 110 on mobile device 202, user may login to ATM 110 using the mobile application. To login, ATM 110 may request that user identification information be entered on mobile device 202 to verify the user's identity and ensure that the user has permission to access the services offered at ATM 110. The user identification information that is required by ATM 110 for verification may vary. Verification may require entry on mobile device 202 of a user ID and a PIN number or other password. For more secure access, multi-factor authentication may be used. For example, in some embodiments, in addition to a user login, a security code may be sent to mobile device 202 and the security code must be entered correctly to confirm user identification. In some embodiments, a security/challenge question must be answered. In some embodiments, entry of biometric data on mobile device 202 may be required. Examples of biometric data that may be used include a fingerprint, a picture of the user's face for performing face recognition, or a voice print, to name a few. Verification by ATM 110 may be performed with reference to user information that is stored at data center 230. Upon successful verification, a banking session may begin.

User 200 may perform transactions via ATM 110 using mobile device 202. ATM 110 may confirm transactions (e.g., account balances or money available for withdrawal) by communicating with data center 230 where the information is maintained and updated. ATM 110 may be used to dispense cash for withdrawals and to deposit cash or checks where ATM 110 has those capabilities. ATM 110 may also be used to dispense a paper receipt at the close of the banking session.

FIG. 2A also shows that a second user 250, User 2, may be waiting to use ATM 110 for a future banking transaction using mobile device 252 of user 250 while user 200 is conducting a transaction using mobile device 202. Mobile device 252 may communicate with ATM 110, for example, over link 254 such as with a short range wireless communication (e.g., NFC) or via link 256 over a mobile communications network 240, such as a 5G or 6G network. Mobile device 252 may obtain and install the mobile application to interact with ATM 110 via the Internet while waiting for user 200 to complete the banking session of user 200. In some embodiments, if the range of wireless communications from ATM 110 is sufficient to reach mobile device 252 while user 200 is interacting with ATM 110, ATM 110 may push a notification to mobile device 252. The notification may provide access to or activate the mobile application on mobile device 252 to prepare for a banking session between ATM 110 and mobile device 252 after the current session with mobile device 202 is completed. User 250 may just wait to obtain the mobile application to be pushed from ATM 110 after the current session with user 200 is completed.

As another option, while waiting to access ATM 110, user 250 may use the mobile application to log in to a web site to initiate communication with ATM 110. When user 200 is finished with the session on ATM 110, mobile device 252 may transfer online communication to communicate directly with ATM 110 such as to perform withdrawals, deposits, or obtain a printed receipt.

The use of mobile device 202 also enables one or more cameras 203 on mobile device 202 to monitor the surroundings while user 200 is using ATM 110. The video may be provided as a live feed from mobile device 202 to a security monitoring system that may be implemented at ATM 110 and may be used to capture images or video to supplement video captured by camera 126 at ATM 110.

Figure 2B:
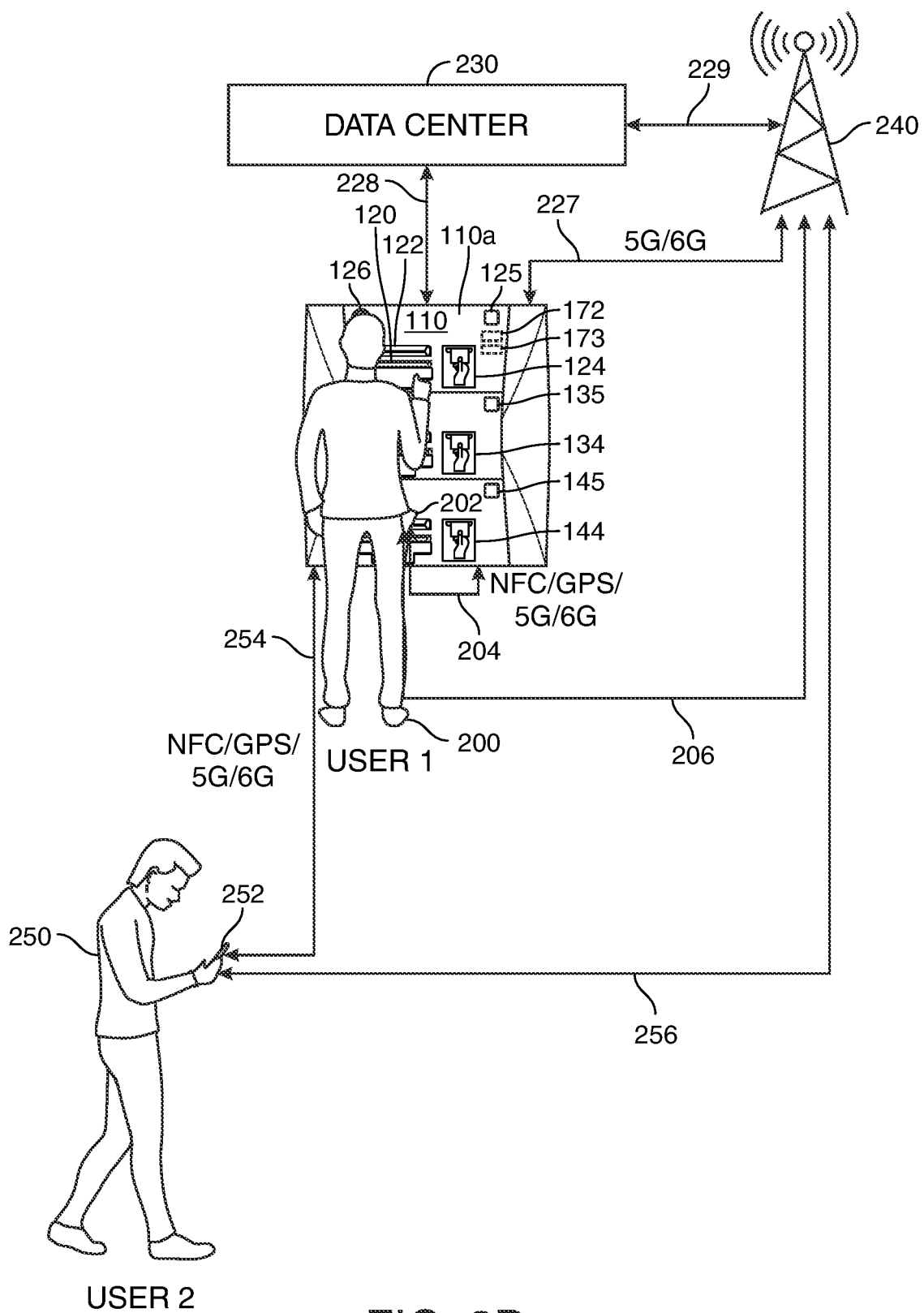
FIG. 2B shows an illustrative manner of making a deposit or withdrawal at an ATM using the top level of the ATM of FIG. 2A in accordance with principles of the disclosure.

FIG. 2B shows an illustrative manner of user 200 making a deposit or withdrawal at ATM 110 after user 200 has initiated the deposit or withdrawal using mobile device 202. User 200 may have a preference to use a particular level of ATM 110 to use by one or more of various selection methods. The preference may be based on user height or for some other reason, such as a tray on the preferred level is out of order.

As noted, user 200 may be able to request which level to use. In embodiments, the mobile application may provide a way to select which level of ATM 110 to use. In embodiments, the level may be selected on ATM 110, such as, for example, by pressing one of buttons 125, 135 or 145 to respectively select the top, middle or bottom levels 110*a*, 110*b*, 110*c*. The choice of which level to use may alternatively be selected automatically by ATM 110, such as by sensing the location of the user's head relative to ATM 110 with one or more detectors. The top, middle or bottom level may also be selected by user 200 using the mobile device 202, where the mobile device is configured, such as with the mobile application, to enable this selection.

Thus, a taller user, such as user 200, may use the top level 110*a* of ATM 110 for transactions. User 200 may insert the deposit into deposit slot 122 at ATM 110. User 200 may similarly obtain a withdrawal that has been requested using mobile device 202 from withdrawal tray 120 or may obtain a printed receipt from receipt dispenser 124 after requesting a receipt using mobile device 202.

Figure 3A:
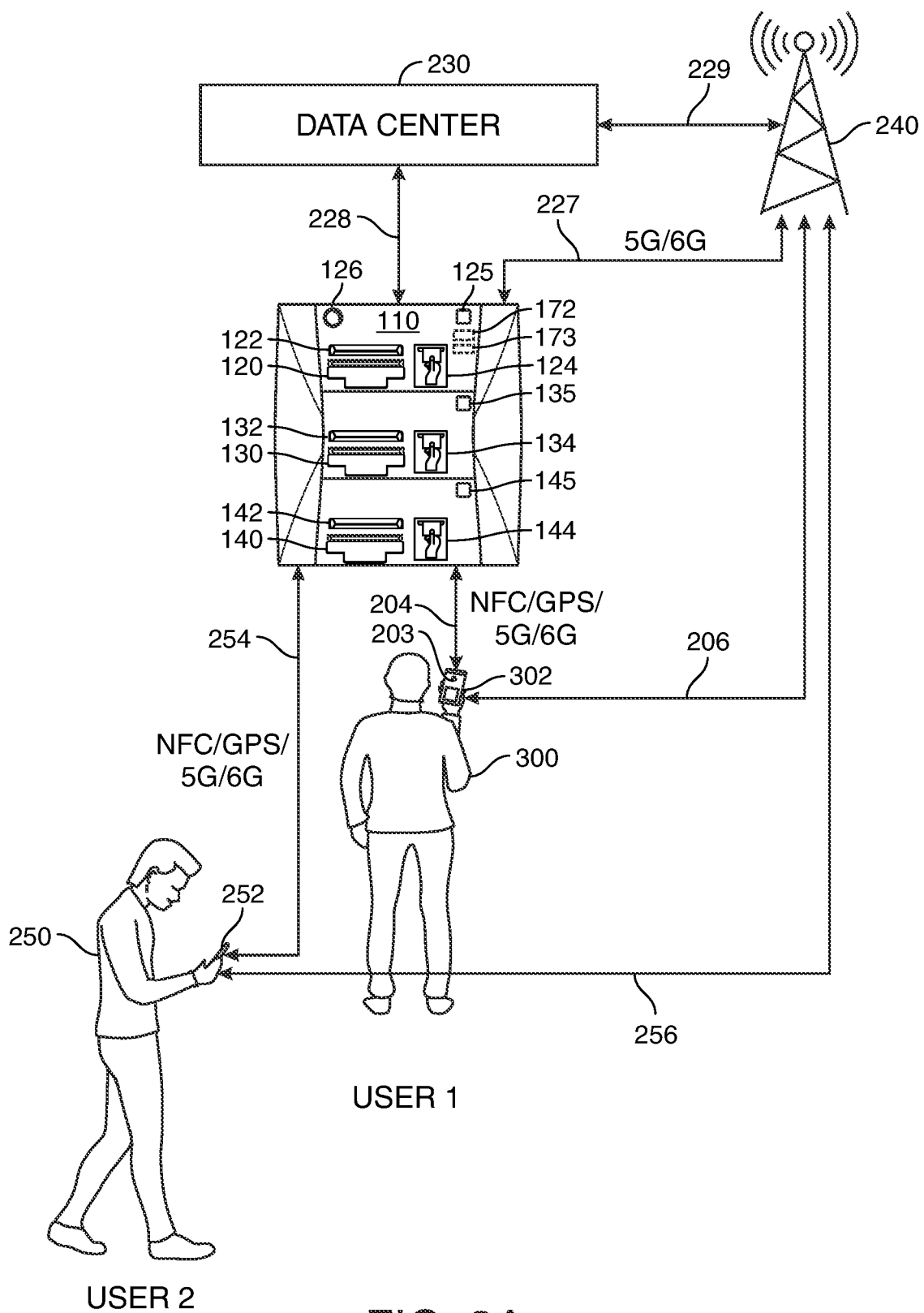
FIG. 3A shows an illustrative manner of using one or more mobile devices to interact with an ATM at a middle level of multiple vertical levels of input and output trays in accordance with principles of the disclosure.
Figure 3B:
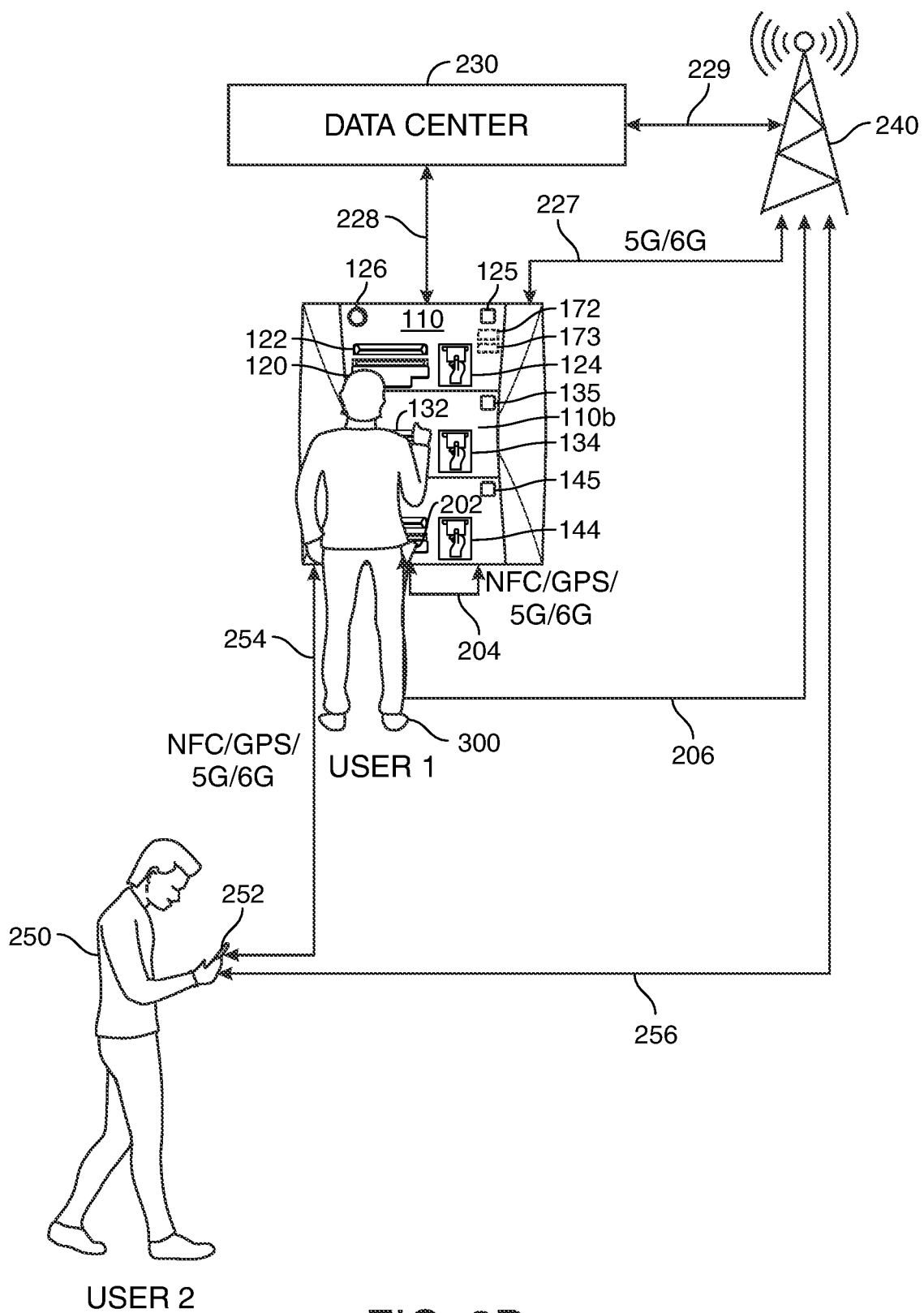
FIG. 3B shows an illustrative manner of making a deposit or withdrawal at an ATM using the middle level of the ATM of FIG. 3A in accordance with principles of the disclosure.

FIG. 3A shows another example where a user 300, who may be shorter than user 200 shown in FIGS. 2A and 2B, may interact with ATM 110 using a mobile device 302. User 300 may interact with ATM 110 similar to the interaction between user 200 and ATM 110 described above with respect to FIG. 2A. As shown in FIG. 3B, user 300 may select middle level 110*b* of ATM 110 for transactions like deposits, withdrawals, and receipts, or middle level 110*b* may be automatically selected by ATM 110 for use by user 300.

Figure 4A:
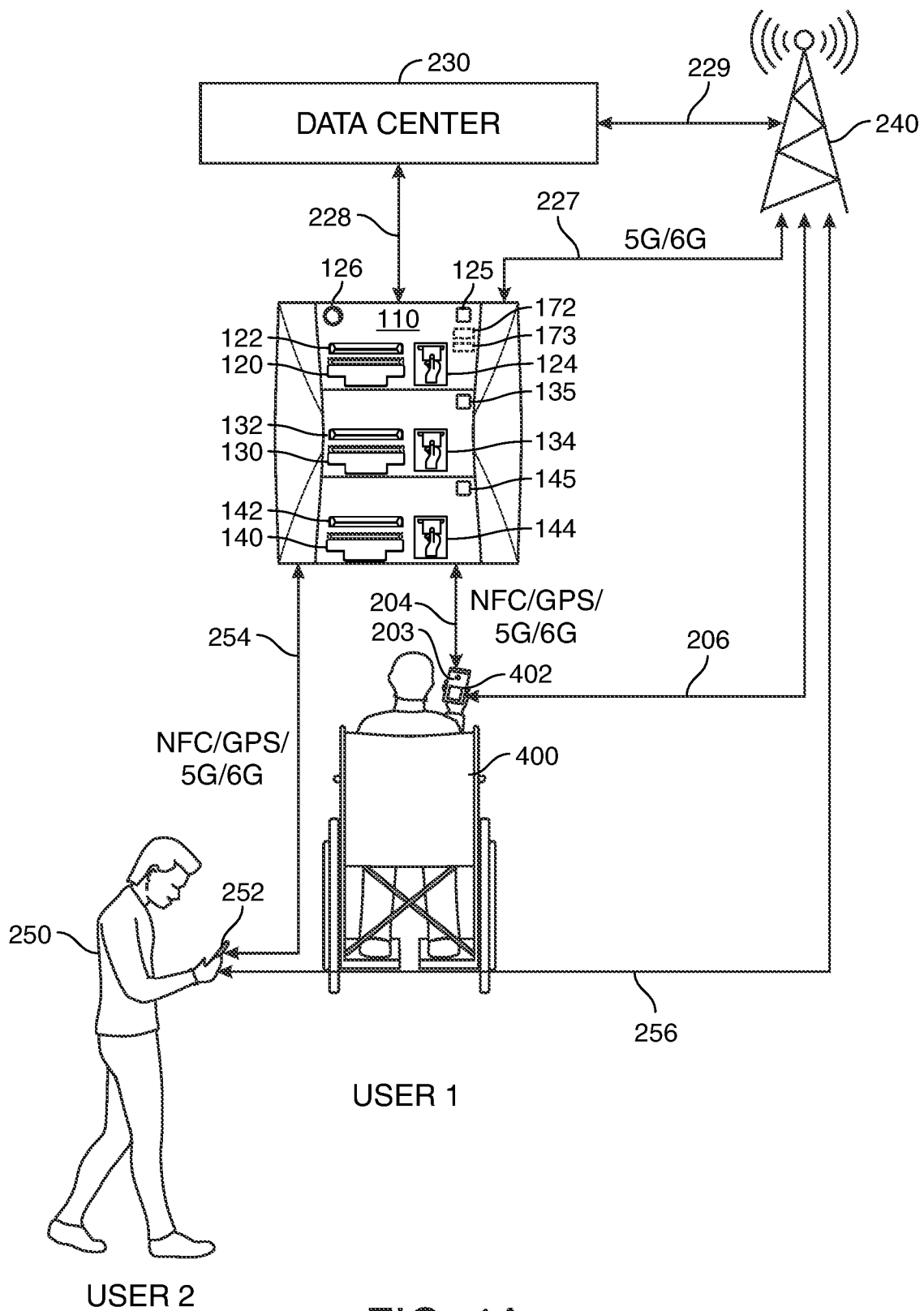
FIG. 4A shows an illustrative manner of using one or more mobile devices to interact with an ATM at a bottom level of multiple vertical levels of input and output trays in accordance with principles of the disclosure.
Figure 4B:
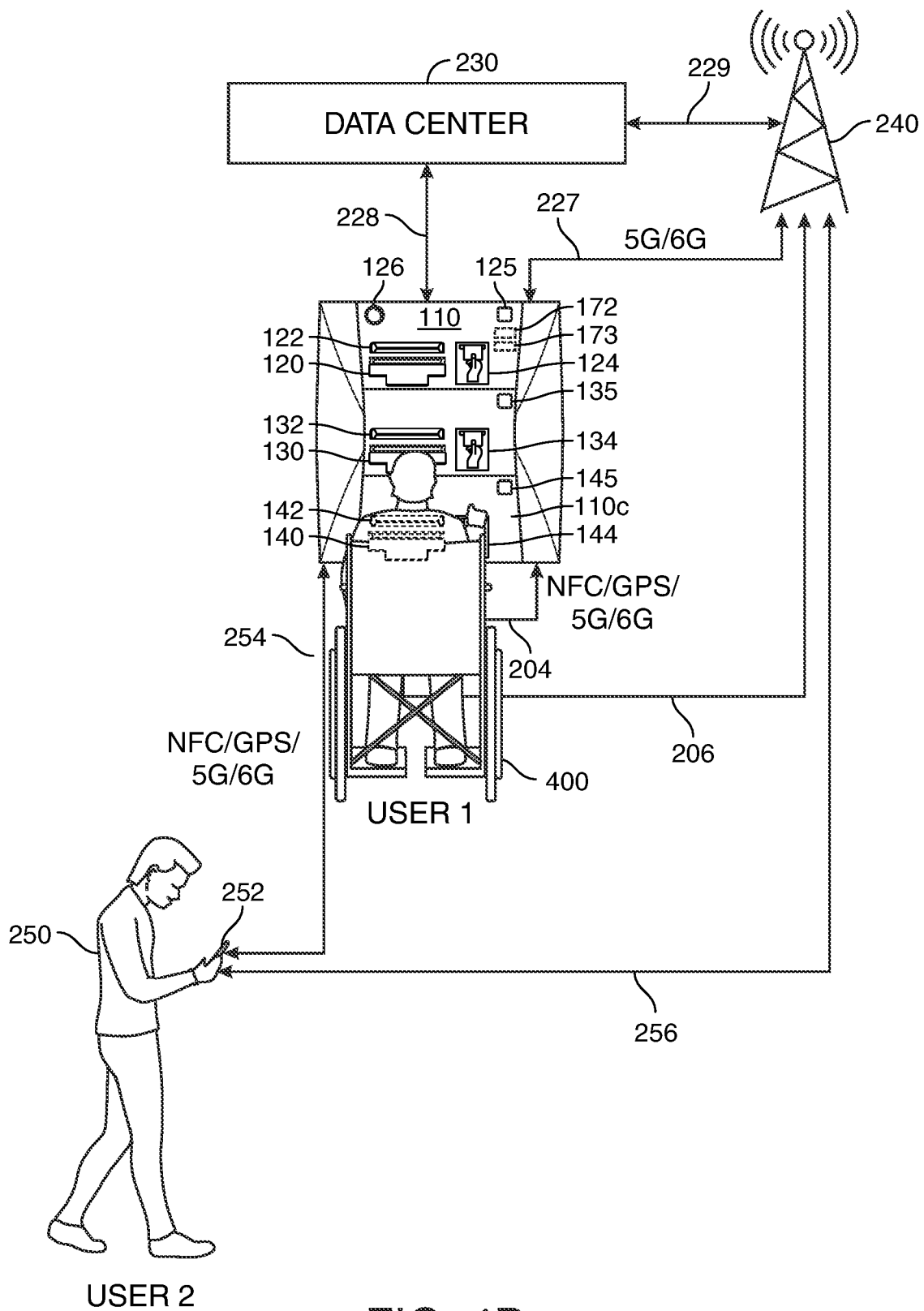
FIG. 4B shows an illustrative manner of making a deposit or withdrawal at an ATM using the bottom level of the ATM of FIG. 4A in accordance with principles of the disclosure.

FIG. 4A shows another example where a user 400, such as a wheelchair-bound individual, may interact with an ATM 110 using a mobile device 402. User 400 may interact with ATM 110 similar to the interaction between user 200 and ATM 110 described above with respect to FIG. 2A. However, as shown in FIG. 4B, user 400 may be situated for banking at a lower level than user 200 or user 300 of FIG. 3A. User 400 is shown, for example, sitting in a wheelchair. Thus, user 400 may select bottom level 110*c* of ATM 110 for transactions like deposits, withdrawals, and receipts, or bottom level 110*c* may be automatically selected by ATM 110 for use by user 400.

Figure 5:
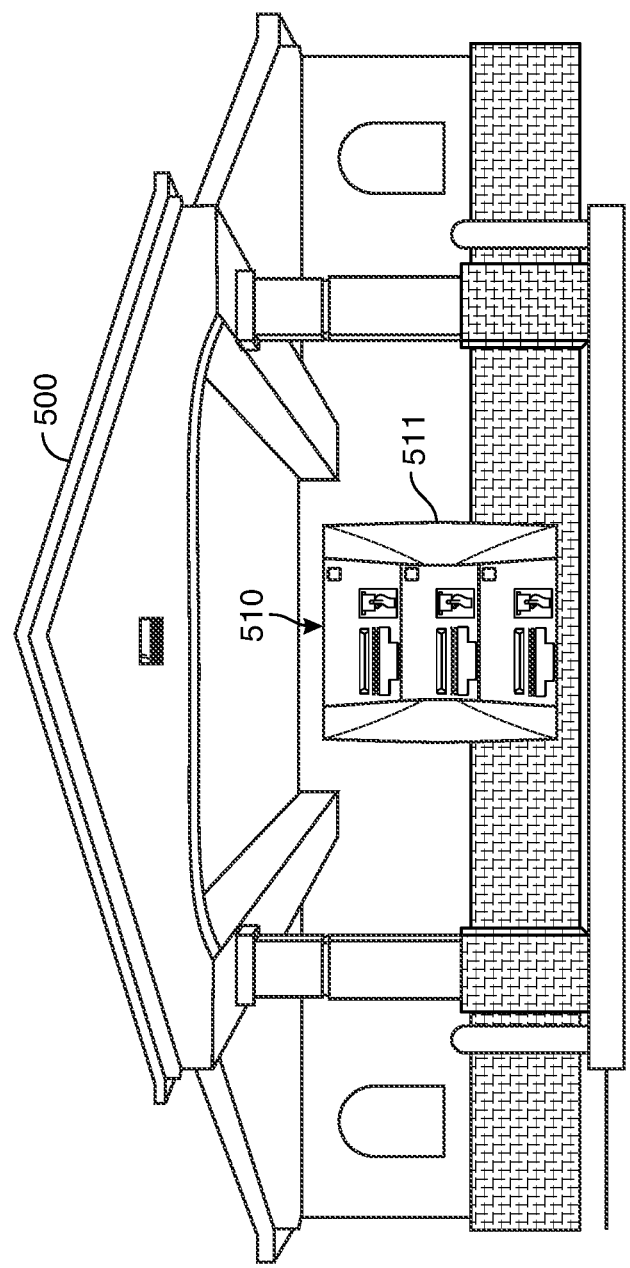
FIG. 5 shows an illustrative ATM installed on an exterior of a building in accordance with principles of the disclosure.

FIG. 5 shows an ATM 510, which may be the same as or similar to ATM 110, having multiple vertical levels of input and output trays, may be installed on an exterior of a building 500. A user may approach ATM 510 such as driving up to ATM 510 in a drive-thru lane adjacent building 500 or may approach 510 without any vehicle. Where the user is an occupant of a vehicle, the mobile device may be positioned within the vehicle. Mobile device in the vehicle may be a laptop, iPad, tablet, a smartphone, a computing system run on a smart car, or any other computing device. The computing system may be a vehicle-installed system that may include, for example, a screen mounted to a dashboard, a car roof, or back of a seat, that supports short range communication or wireless communication, such as (NFC), Wi-Fi, Zigbee, Bluetooth, or Ultra-Wideband (UWB) technologies and that is enabled to support an app that interacts with an ATM. Mobile application may be loaded on a mobile device. When computing system is a vehicle-installed system, the mobile application may appear on a portion of the screen of the mobile device, rather than on an entirety of screen. This allows room for display of other information on the screen of the mobile device such as GPS information. A user of ATM 510 may select which of multiple vertical levels to use for deposits, withdrawals, or receipts.

Figure 6:
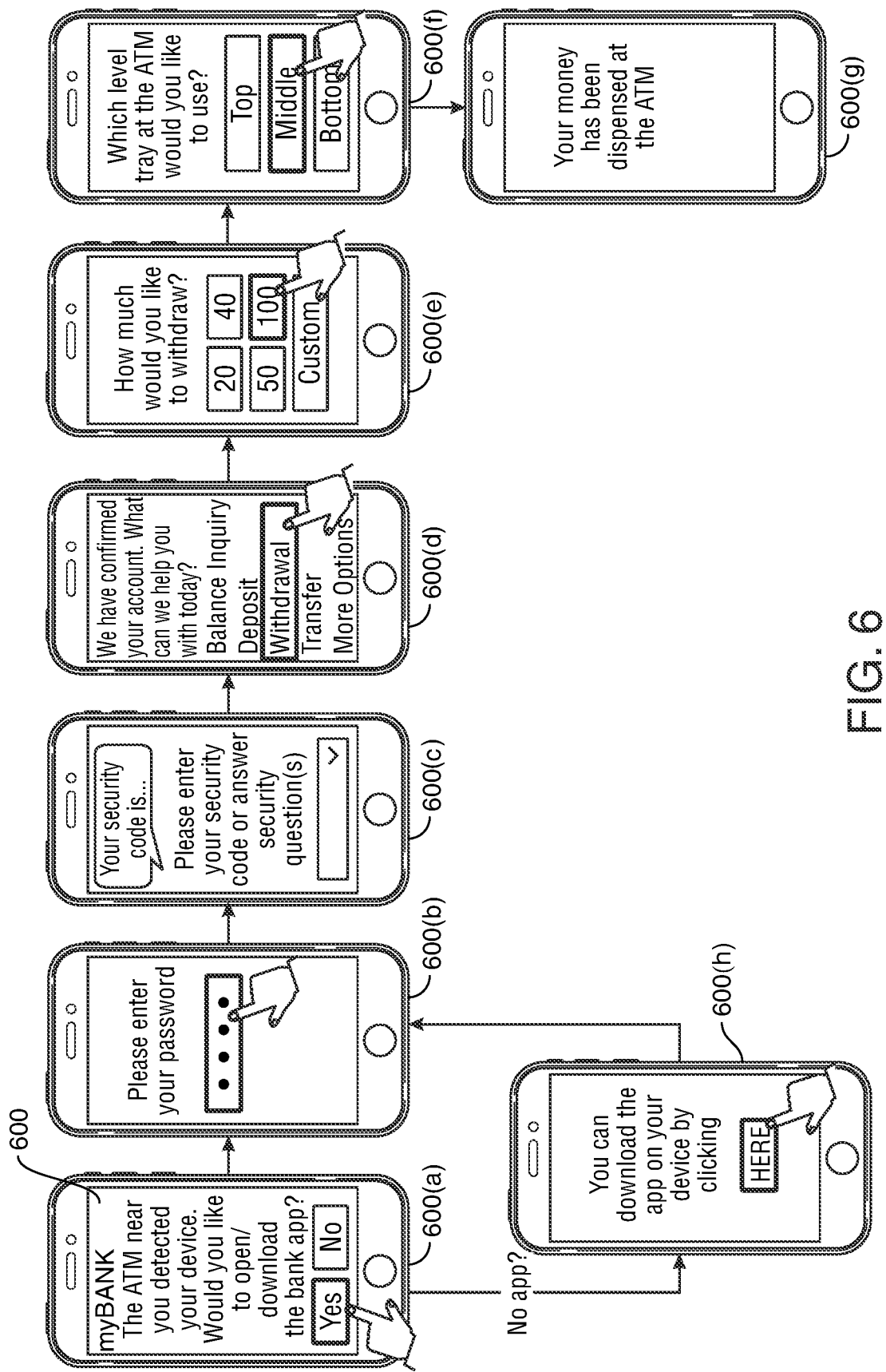
FIG. 6 shows an illustrative series of screens that may appear on a mobile device while interacting with the ATM in accordance with principles of the disclosure.

FIG. 6 shows an example of illustrative screens that may be displayed on a screen, such as any of mobile devices 202, 302, 402 during interactions between an ATM, such as ATM 110 or ATM 510, and a respective one of the mobile devices. Screen 600(a) shows an illustrative screen when ATM 110 detects one of the mobile devices 202, 302, or 402. The screen may offer the option to open or download the mobile application. Upon selection of open/download, if the application is not already installed on the respective mobile device, screen 600(h) may be displayed to offer an option of downloading the application. The mobile application may be launched on the respective mobile device and may be displayed on the entirety of the screen or just on a portion of the screen.

Screen 600(b) shows an example of one of the screens that may be used in entering user identification information for user verification purposes during login. This may be followed by another screen, such as screen 600(c), that requests a verification code or an answer to one or more security/challenge questions for multi-factor authentication.

Once the user is granted access to ATM 110, a screen may appear on the mobile device showing a menu of available banking services (transactions) that may be performed using a mobile device via ATM 110. The menu that appears may replicate the menu screen that would have been accessed on an ATM that had a screen. The menu could also look different from an ATM menu screen. An illustrative screen is shown in screen 600(d). The desired service may then be selected. If not all services may be displayed on a single screen, the screen may offer a user an option to select "More Options" to see additional service options. In the example illustrated in screen 600(d), a user chooses to perform a withdrawal via ATM 110. Screen 600(e) may then present a screen to choose an amount to withdraw. Screen 600(f) may offer the user an option as to which level of the ATM—e.g., top, middle or bottom—to, for example, dispense the cash. Once dispensed, screen 600(g) may indicate that money has been dispensed at ATM 110.

Figure 7:
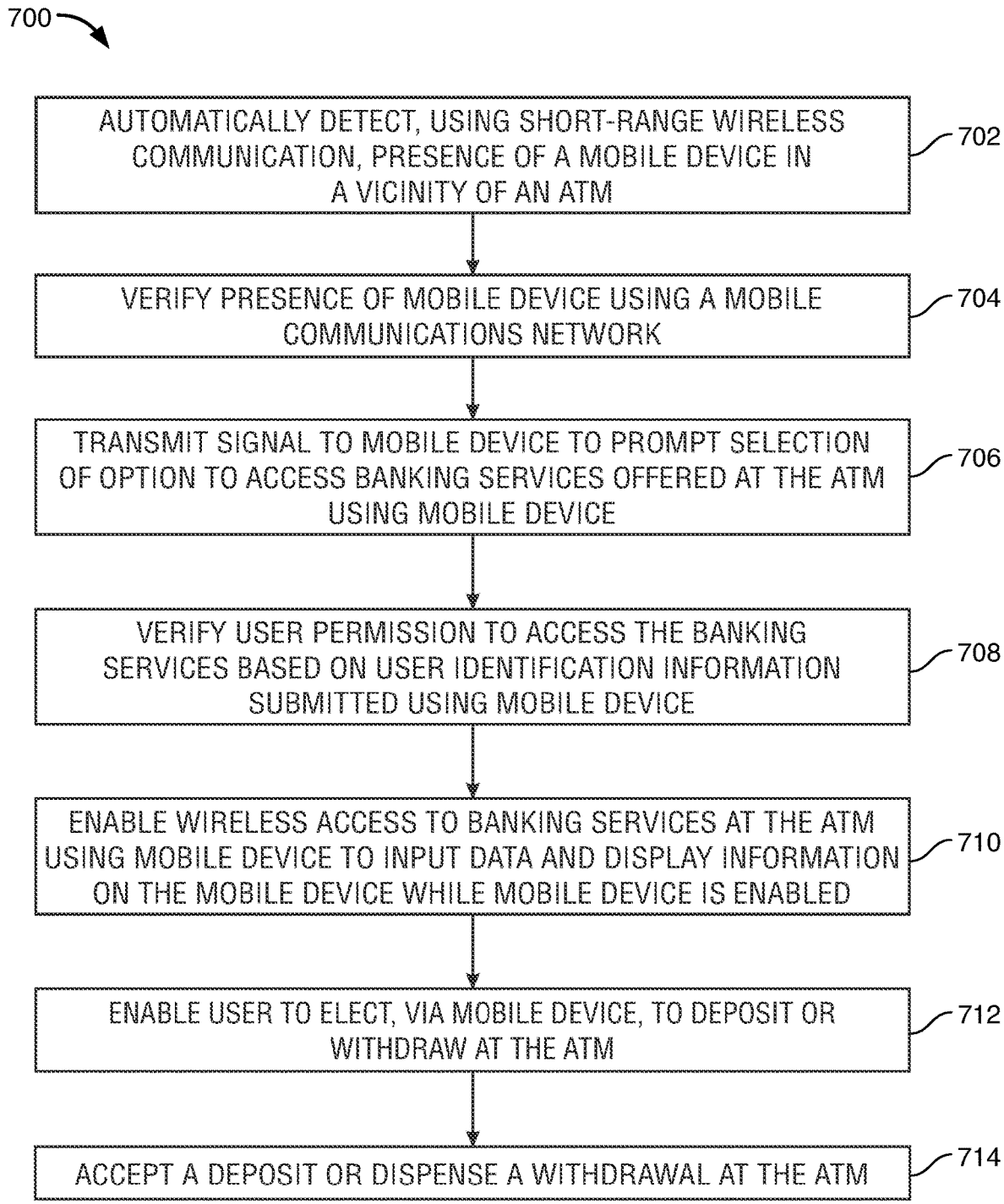
FIG. 7 shows an illustrative flow chart of method steps that may be performed at an ATM in accordance with principles of the invention.

FIG. 7 shows an illustrative flow chart of a method 700 that may be performed at ATM 110 in accordance with principles of the invention.

The method 700 may begin at step 702 when an ATM may automatically detect the presence of a mobile device in a vicinity of the ATM. The detection may be via a short-range wireless communication. Step 702 may be unnecessary where the user of the mobile device initiates communication with the ATM before being detected. At step 704, the presence of a mobile device in the vicinity of the ATM may be verified, such as by using a mobile communications network. At step 706, the ATM may transmit a signal to the mobile device to prompt a user of the mobile device to select an option to access banking services offered at the ATM using the mobile device. At step 708, if a user requests access to banking services offered at the ATM, the ATM may verify the user permission to access the banking services that are requested based on user identification information submitted using the mobile device. At step 710, after verification of the user identification information, the ATM may enable wireless access to banking services at the ATM using the mobile device to input data and display information. At step 712, the ATM may enable a user to elect to make a deposit or withdrawal at the ATM. At step 714, the ATM may accept a user's request to make a deposit or dispense a withdrawal at the ATM. The user's request for a deposit or withdrawal may specify which level of a multi-level ATM to use for deposits or withdrawals. Multiple transactions may be made during a single banking session. When the transactions are completed, the user logs off and the session ends.

Figure 8:
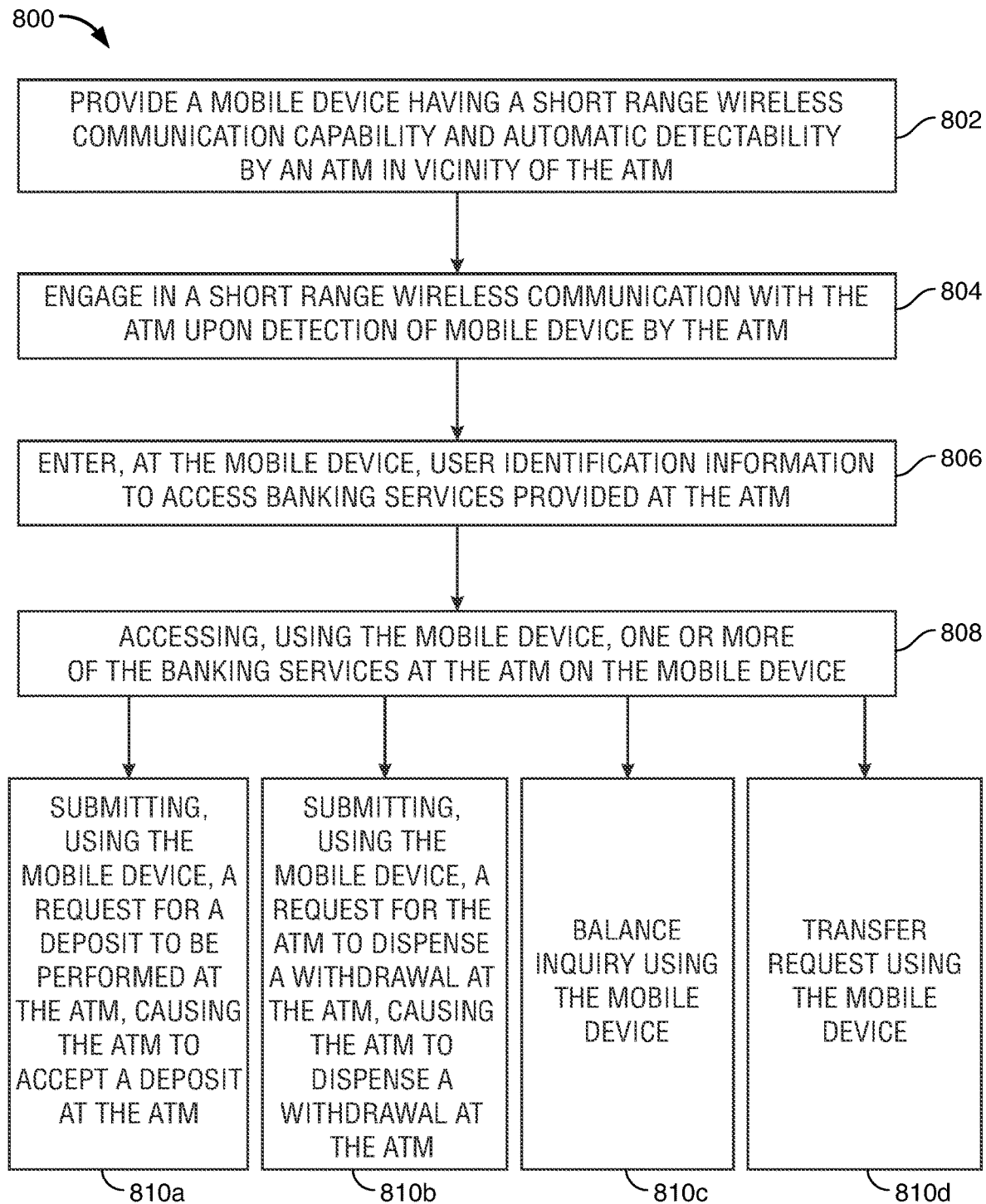
FIG. 8 shows an illustrative flow chart of method steps that may be performed at a mobile device to interact with the ATM in accordance with principles of the invention.

FIG. 8 shows an illustrative flow chart of a method 800 that may be performed at a mobile device in accordance with principles of the invention. At step 802, a mobile device may be provided. The mobile device may have a short range wireless communication capability and may be automatically detectable by an ATM when the mobile device is in the vicinity of the ATM. At step 804, the mobile device may engage in a short range wireless communication with the ATM upon detection of the mobile device by the ATM. At step 806, a user may enter at the mobile device user identification information to access banking services provided at the ATM. At step 808, if the user identification information is verified by the ATM, the user may access one or more of the banking services at the ATM using the mobile device. At step 810a, the user may, for example, submit a request, using the mobile device, to perform a deposit at the ATM. At step 810b, the user may, for example, submit a request, using the mobile device, for the ATM to dispense a withdrawal. The user's request for a deposit or withdrawal may specify which level of a multi-level ATM to use for deposits or withdrawals. At step 810c, the user may, for example, use the mobile device to request via the ATM a balance inquiry for one or more accounts. At step 810d, the user may, for example, use the mobile device to request that a funds transfer be performed via the ATM.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 9:
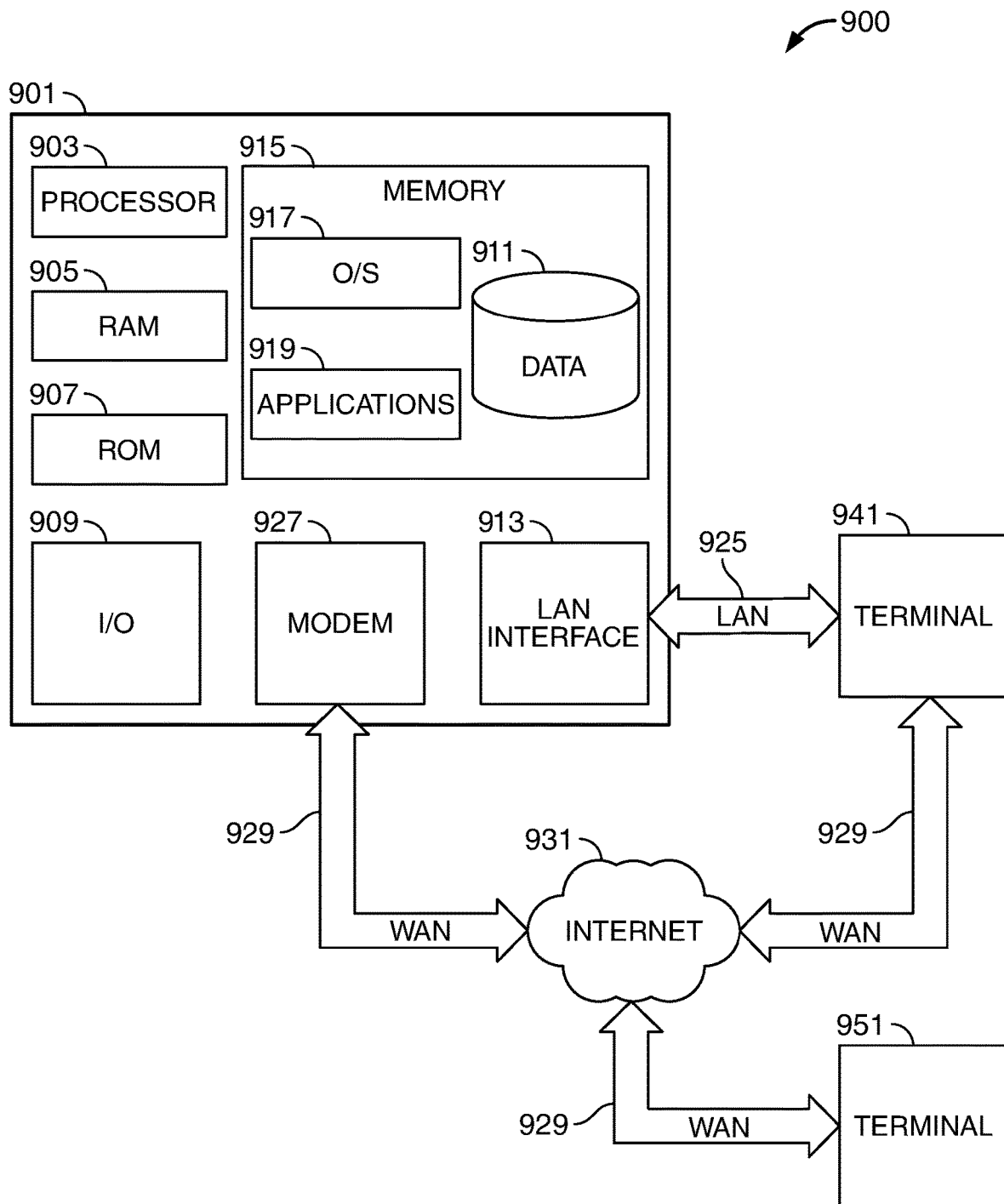
FIG. 9 shows an illustrative system architecture in accordance with principles of the disclosure.

FIG. 9 shows an illustrative block diagram of system 900 that includes computer 901. Computer 901 may alternatively be referred to herein as an "engine," "server" or a "computing device." Computer 901 may be any computing device described herein, such as the computing devices running on the one or more of the ATM, smart phones, smart cars, smart cards and any other mobile device described herein. Elements of system 900, including computer 901, may be used to implement various aspects of the systems and methods disclosed herein.

Computer 901 may have a processor 903 for controlling the operation of the device and its associated components, and may include RAM 905, ROM 907, input/output circuit 909, and a non-transitory or non-volatile memory 915. Machine-readable memory may be configured to store information in machine-readable data structures. Other components commonly used for computers, such as EEPROM or Flash memory or any other suitable components, may also be part of the computer 901.

The memory 915 may be comprised of any suitable permanent storage technology—e.g., a hard drive. The memory 915 may store software including the operating system 917 and application(s) 919 along with any data 911 needed for the operation of computer 901. Memory 915 may also store videos, text, and/or audio assistance files. The data stored in Memory 915 may also be stored in cache memory, or any other suitable memory.

Input/output ("I/O") module 909 may include connectivity to a microphone, keyboard, touch screen, mouse, and/or stylus through which input may be provided into computer 901. The input may include input relating to cursor movement. The input/output module may also include one or more speakers for providing audio output and a video display device for providing textual, audio, audiovisual, and/or graphical output. The input and output may be related to computer application functionality.

Computer 901 may be connected to other systems via a local area network (LAN) interface 913. Computer 901 may operate in a networked environment supporting connections to one or more remote computers, such as terminals 941 and 951. Terminals 941 and 951 may be personal computers or servers that include many or all of the elements described above relative to computer 901.

In some embodiments, computer 901 may be the ATM 110 and Terminals 941 and 951 may be the data center 230, and/or any of mobile devices that may be in electronic communication with ATM 110 via LAN, WAN or any other suitable short-range communication when a network connection may not be established.

When used in a LAN networking environment, computer 901 is connected to LAN 925 through a LAN interface 913 or an adapter. When used in a WAN networking environment, computer 901 may include a modem 927 or other means for establishing communications over WAN 929, such as Internet 931.

In some embodiments, computer 901 may be connected to one or more other systems via a short-range communication network (not shown). In these embodiments, computer 901 may communicate with one or more other terminals 941 and 951, such as the mobile devices described herein etc., using a personal area network (PAN) such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 919, which may be used by computer 901, may include computer executable instructions for invoking functionality related to communication, such as e-mail, Short Message Service (SMS), and voice input and speech recognition applications. Application program(s) 919 (which may be alternatively referred to herein as "plugins," "applications," or "apps") may include computer executable instructions for invoking functionality related to performing various tasks. Application programs 919 may utilize one or more algorithms that process received executable instructions, perform power management routines or other suitable tasks.

Application program(s) 919 may include computer executable instructions (alternatively referred to as "programs"). The computer executable instructions may be embodied in hardware or firmware (not shown). The computer 901 may execute the instructions embodied by the application program(s) 919 to perform various functions.

Application program(s) 919 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 919 may include one or more algorithms that may be used to implement features of the disclosure.

The invention may be described in the context of computer-executable instructions, such as applications 919, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 901 and/or terminals 941 and 951 may also include various other components, such as a battery, speaker, and/or antennas (not shown). Components of computer system 901 may be linked by a system bus, wirelessly or by other suitable interconnections. Components of computer system 901 may be present on one or more circuit boards. In some embodiments, the components may be integrated into a single chip. The chip may be silicon-based.

Terminal 951 and/or terminal 941 may be portable devices such as a laptop, cell phone, Blackberry™, tablet, smartphone, or any other computing system for receiving, storing, transmitting and/or displaying relevant information. Terminal 951 and/or terminal 941 may be one or more user devices. Terminals 951 and 941 may be identical to computer 901 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 10:
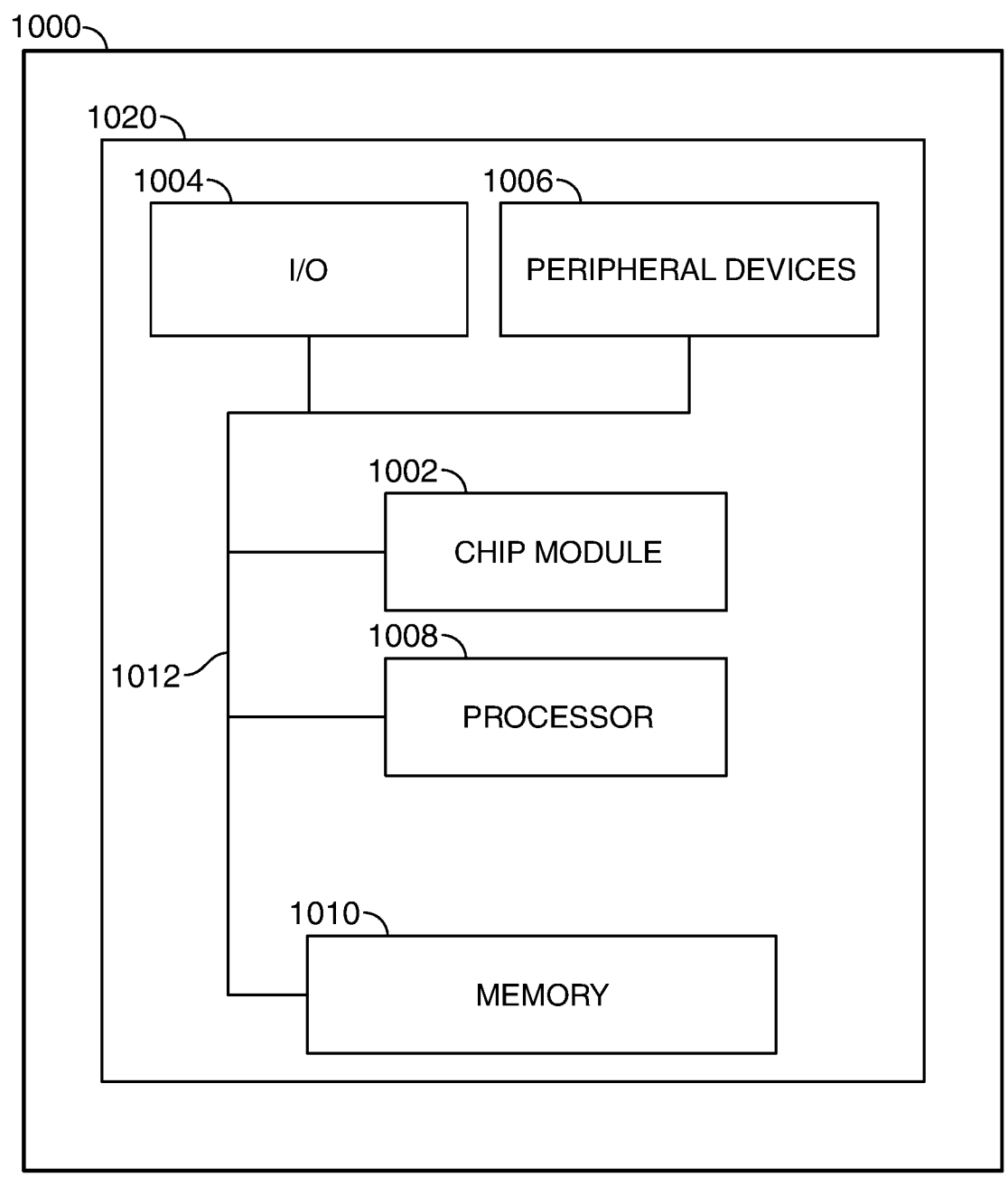
FIG. 10 shows an illustrative architecture of a mobile device in accordance with principles of the disclosure.

FIG. 10 shows illustrative apparatus 1000 that may be configured in accordance with the principles of the disclosure. Apparatus 1000 may be a computing device. Apparatus 1000 may include chip module 1002, which may include one or more integrated circuits, and which may include logic configured to perform any other suitable logical operations.

Apparatus 1000 may include one or more of the following components: I/O circuitry 1004, which may include a transmitter device and a receiver device and may interface with fiber optic cable, coaxial cable, telephone lines, wireless devices, PHY layer hardware, a keypad/display control device or any other suitable media or devices; peripheral devices 1006, which may include counter timers, real-time timers, power-on reset generators or any other suitable peripheral devices; logical processing device 1008, which may compute data structural information and structural parameters of the data; and machine-readable memory 1010.

Machine-readable memory 1010 may be configured to store in machine-readable data structures: machine executable instructions, (which may be alternatively referred to herein as "computer instructions" or "computer code"), applications such as applications 919, signals, and/or any other suitable information or data structures.

Components 1002, 1004, 1006, 1008 and 1010 may be coupled together by a system bus or other interconnections 1012 and may be present on one or more circuit boards such as circuit board 1020. In some embodiments, the components may be integrated into a single chip. The chip may be silicon-based.

A multi-level ATM thus may provide users with enhanced convenience and accessibility to ATMs. The multi-level ATM may be more practicable where the ATM is screen-less as the space on the ATM otherwise occupied by a screen may be used for other purposes. A screen-less ATM is possible where a mobile device may be used to interact with an ATM to access banking services and perform a banking transaction.

Thus, methods and systems are provided for enabling ATM having multiple vertical levels of input and output trays to interact with a mobile device to access banking services and conduct banking transactions in the vicinity of the ATM using the mobile device. Persons skilled in the art will appreciate that the present invention can be practiced by other than the described embodiments, which are presented for purposes of illustration rather than of limitation.

What is claimed is:

1. A method for enabling a banking transaction to be conducted at an automated teller machine (ATM) using a mobile device for user interaction with the ATM, the method comprising:
   providing access, by an ATM to a user mobile device in a vicinity of the ATM, to enable a user to interact with the mobile device to select an option presented on the mobile device to access a plurality of banking services offered at the ATM;
   wherein the ATM includes disposed thereon multiple vertical levels of deposit slots and withdrawal trays;
   verifying that the user has permission to access the banking services offered at the ATM based on user identification information submitted via the mobile device;
   after verification of the user identification information, enabling the user to access the banking services at the ATM by interacting with the mobile device and to view on the mobile device information related to the banking services; and
   in response to user interaction with the mobile device, accepting a deposit of currency or one or more checks at a user-selected one of the deposit slots or dispensing a withdrawal of currency at a user-selected one of the withdrawal trays.

2. The method of claim 1, further comprising:
enabling the user to specify, via user interaction at the ATM, the one of the multiple vertical levels at which to accept the deposit or to dispense the withdrawal.

3. An automated teller machine (ATM) comprising:
a non-transitory computer-readable memory storing computer-executable instructions that, when executed by a processor on a computer, cause the computer to:
   provide access, by an ATM to a user mobile device in a vicinity of the ATM, to enable a user to interact with the mobile device to select an option presented on the mobile device to access a plurality of banking services offered at the ATM, wherein the ATM includes disposed thereon multiple vertical levels of deposit slots and withdrawal trays;
   verify that the user has permission to access the banking services offered at the ATM based on user identification information submitted via the mobile device;
   after verification of the user identification information, enable the user to access the banking services at the ATM by interacting with the mobile device and to view on the mobile device information related to the banking services; and
   in response to user interaction with the mobile device, accept a deposit of currency or one or more checks at a user-selected or an ATM-selected one of the deposit slots or dispense a withdrawal of currency at a user-selected or an ATM-selected one of the withdrawal trays.

4. The ATM of claim 3, wherein the banking services that the user is enabled to access at the ATM via interaction with the mobile device comprises at least one of:
   a cash withdrawal;
   a deposit of cash or a check;
   an electronic funds transfer;
   a check balance transaction; or
   an electronic payment.

5. The ATM of claim 3, wherein each of the multiple vertical levels further comprises disposed thereon a transaction receipt dispenser.

6. The ATM of claim 3, wherein the ATM includes no display screen disposed thereon.

7. A method for enabling a banking transaction to be conducted at an automated teller machine (ATM) using a mobile device for user interaction with the ATM, the method comprising:
   providing access, by an ATM to a user mobile device in a vicinity of the ATM, to enable a user to interact with the mobile device to select an option presented on the mobile device to access a plurality of banking services offered at the ATM;
   wherein the ATM includes disposed thereon multiple vertical levels of deposit slots and withdrawal trays;
   verifying that the user has permission to access the banking services offered at the ATM based on user identification information submitted via the mobile device;
   after verification of the user identification information, enabling the user to access the banking services at the ATM by interacting with the mobile device and to view on the mobile device information related to the banking services; and
   in response to user interaction with the mobile device, accepting a deposit of currency or one or more checks at an ATM-selected one of the deposit slots or dispensing a withdrawal of currency at an ATM-selected one of the withdrawal trays.

* * * * *